US012798933B2

(12) United States Patent
Chalavon et al.

(10) Patent No.: US 12,798,933 B2
(45) Date of Patent: Nov. 17, 2026

(54) LIFTING MACHINERY WITH AUTOMATED REEVING CONFIGURATION CHANGE

(71) Applicant: MANITOWOC CRANE GROUP FRANCE, Dardilly (FR)

(72) Inventors: Jonathan Chalavon, Mions (FR); Matthieu Cormier, Champagne Au Mont d+3 Or (FR); Cédric Fourier, Crottet (FR); Adrien Gourru, Lyons (FR)

(73) Assignee: Manitowoc Crane Group France, Dardilly (FR)

( * ) Notice: Subject to any disclaimer, the term of this patent is extended or adjusted under 35 U.S.C. 154(b) by 305 days.

(21) Appl. No.: 18/467,533

(22) Filed: Sep. 14, 2023

(65) Prior Publication Data

US 2024/0083722 A1 Mar. 14, 2024

(30) Foreign Application Priority Data

Sep. 14, 2022 (FR) ....................................... 2209228

(51) Int. Cl.
*B66D 3/04* (2006.01)
*B66C 11/16* (2006.01)
*B66C 13/16* (2006.01)

(52) U.S. Cl.
CPC .............. *B66D 3/043* (2013.01); *B66C 11/16* (2013.01); *B66C 13/16* (2013.01)

(58) Field of Classification Search
CPC . B66D 3/04; B66D 3/043; B66D 3/06; B66D 3/10; B66D 1/00; B66C 9/02;
(Continued)

(56) References Cited

U.S. PATENT DOCUMENTS 5,579,931 A * 12/1996 Zuehlke .................. B66C 13/18 212/281
8,905,381 B2 * 12/2014 Slob ......................... B66D 3/04 254/273
(Continued)

FOREIGN PATENT DOCUMENTS

CN 109879181 A * 6/2019
CN 111170157 A * 5/2020
(Continued)

OTHER PUBLICATIONS

Search Report and Written Opinion issued in connection with FR Pat. Appl. 22/09228, dated Apr. 21, 2023.

*Primary Examiner* — Ictoria P Augustine
*Assistant Examiner* — Henrix Soto
(74) *Attorney, Agent, or Firm* — Cook Alex Ltd.

(57) ABSTRACT

A lifting machinery includes a lower reeve block and an upper reeve block, the lower reeve block hanging by a lifting rope connected to a lifting winch, and a reversible connection mechanical system to be reversibly configurable between two reeving configurations including a connected configuration and a disconnected configuration. The reversible connection mechanical system includes a locking element, a locking complementary element and an elastic return member urging the locking element to engage with the locking complementary element. The lifting machinery further includes a control/command unit configured to pilot the lifting winch and a sensor configured to measure a force on a strand of the lifting rope. The control/command unit is configured to pilot the lifting winch in a connection phase and in a disconnection phase according to the measurement data of the force on the strand of the lifting rope.

12 Claims, 5 Drawing Sheets

(58) Field of Classification Search

CPC ......... B66C 11/16; B66C 13/00; B66C 13/16; B66C 13/18; B66C 13/23; B66C 23/26; B66C 23/62; B66C 23/88; B66C 23/90; B66C 23/905; B66C 2700/017

USPC .......................................................... 212/276

See application file for complete search history.

(56) References Cited

U.S. PATENT DOCUMENTS

| | | | | | |
|---|---|---|---|---|---|
| 9,656,838 | B2 * | 5/2017 | Weckbecker | .......... | B66D 1/741 |
| 10,287,137 | B2 * | 5/2019 | Kawai | ..................... | B66C 13/28 |
| 10,597,266 | B2 * | 3/2020 | Wiest | ...................... | B66C 13/16 |
| 10,807,837 | B2 * | 10/2020 | Beer | ....................... | B66C 13/08 |
| 11,319,193 | B2 * | 5/2022 | Stilborn | ................. | B66D 1/485 |
| 2021/0188599 | A1 * | 6/2021 | Roni-Damond | ....... | B66D 3/043 |
| 2022/0081267 | A1 * | 3/2022 | Chalavon | ............... | B66D 3/043 |

FOREIGN PATENT DOCUMENTS

| | | | | | |
|---|---|---|---|---|---|
| CN | 113184730 | A | * | 7/2021 | |
| DE | 3543214 | A1 | | 12/1968 | |
| DE | 3149690 | A1 | | 6/1983 | |
| EP | 3225582 | A1 | * | 10/2017 | ............. B66C 23/34 |
| EP | 3415458 | A1 | * | 12/2018 | ............. B66C 11/16 |
| FR | 1520612 | A1 | | 4/1968 | |
| FR | 2131924 | A1 | | 11/1972 | |
| FR | 2137333 | A1 | | 12/1972 | |
| FR | 2228024 | A1 | | 11/1974 | |
| FR | 2333743 | A1 | | 7/1977 | |
| FR | 2333743 | A | * | 8/1977 | ............. B66D 3/043 |
| FR | 2368431 | A1 | | 5/1978 | |
| FR | 3103803 | A1 | | 6/2021 | |
| FR | 3114090 | A1 | | 3/2022 | |
| GB | 2176456 | A1 | | 12/1986 | |
| GB | 2234728 | A | * | 2/1991 | ............. B66C 23/52 |
| KR | 101121689 | B1 | * | 3/2012 | |
| KR | 20200139316 | A | * | 12/2020 | |
| WO | WO-2018115607 | A1 | * | 6/2018 | ............. B66D 3/043 |

* cited by examiner

LIFTING MACHINERY WITH AUTOMATED REEVING CONFIGURATION CHANGE

FIELD

The present disclosure relates to a lifting machinery provided with a double-reeved lifting device, as well as an associated reeving configuration change method.

The subject matter of the present disclosure finds a non-limiting application for a lifting machinery such as a crane, and in particular a tower crane.

BACKGROUND

In a known manner, a double-reeved lifting device is adapted to be reversibly configured between two reeving configurations including a simple-reeved configuration with two lifting strands and a double-reeved configuration with four lifting strands, where the double-reeved lifting device comprises a reeving configuration change system to perform a change of reeving between the simple-reeved configuration and the double-reeved configuration.

Conventionally, such a double-reeved lifting device comprises two reeve blocks, namely a lower reeve block secured to a lifting hook and an upper reeve block, and these two reeve blocks comprise reversible connection means adapted to be reversibly configured between two reeving configurations:

- a connected configuration in which the upper reeve block is connected to the lower reeve block so as to be able to accompany it in ascending/descending movements, and
- a disconnected configuration in which the upper reeve block is disconnected from the lower reeve block so as to be able to remain hanging above the lower reeve block which could perform descending/ascending movements without the upper reeve block.

The lower reeve block is hanging from the lifting machinery by a lifting rope connected to a lifting winch to make the lower reeve block ascend/descend, and this lifting rope passes through the upper reeve block, so that the connected configuration and the disconnected configuration respectively correspond to a double-reeved configuration and to a simple-reeved configuration, or vice versa, of the double-reeved lifting device, depending on the passage of the lifting rope at the level of the upper reeve block.

For example, the documents FR 1 520 612, FR 2 137 333, FR 2 368 431, FR 2 131 924, FR 2 228 024 describe double-reeved lifting devices in which the connected configuration corresponds to the double-reeved configuration, and the disconnected configuration corresponds to the simple-reeved configuration; the lifting rope passing under a pulley carried by the upper reeve block.

And conversely, the documents GB 2 176 456, FR 2 333 743, DE 31 49 690, DE 35 43 214 describe double-reeved lifting devices in which the connected configuration corresponds to the simple-reeved configuration, and the disconnected configuration corresponds to the double-reeved configuration; the lifting rope passing above a pulley carried by the upper reeve block.

The state of the art can also be illustrated by the teachings of document FR3103803 which describes a lifting machinery provided with a double-reeved lifting device, and also comprising a control/command unit connected to a sensor to measure a force on a strand of the lifting rope, wherein this control/command unit is configured or programmed to receive measurement data of the force on the strand of the lifting rope in order to determine the weight of the load and to compare it with a load curve and/or a maximum authorized load value.

However, although it is desired, an automation of reeving configuration changes (switch from the connected configuration into the disconnected configuration, and vice versa) is still not well mastered.

SUMMARY

The present disclosure aims to address this challenge of automating the reeving configuration changes, in order to reliably perform in both the connected configuration and the disconnected configuration.

To this end, the present disclosure provides a lifting machinery, like for example a crane, comprising a double-reeved lifting device comprising two reeve blocks, namely a lower reeve block secured to a lifting hook and an upper reeve block, wherein the lower reeve block is hanging by a lifting rope connected to a lifting winch to make the lower reeve block rise/descend, said lifting rope passing through the upper reeve block,

- wherein the two reeve blocks comprise a reversible connection mechanical system to be reversibly configurable between two reeving configurations:
- a connected configuration in which the upper reeve block is connected to the lower reeve block so as to be able to accompany it in rise/descent movements according to a main axis, and
- a disconnected configuration in which the upper reeve block is disconnected from the lower reeve block so as to be able to remain hanging above the lower reeve block which could perform descent/rise movements without the upper reeve block, This reversible connection mechanical system comprises at least one locking element mounted on one of the two reeve blocks and a locking complementary element mounted on the other one of the two reeve blocks, said locking element being shaped so as to be engaged with said locking complementary element in the connected configuration, an elastic return member urging said locking element to engage with said locking complementary element.

The lifting machinery further comprising:

- a control/command unit piloting the lifting winch in order to make the lower reeve block rise/descend so as to engage, in a connection phase, the locking element with the locking complementary element and thus switch into the connected configuration and so as to release, in a disconnection phase, the locking element from the locking complementary element and thus switch into the disconnected configuration; and
- a sensor to measure a force on a strand of the lifting rope, and the control/command unit is connected to this sensor to receive measurement data of the force on the strand of the lifting rope.

According to the present disclosure, this control/command unit is configured or programmed to automatically monitor a reeving configuration change based on the measurement data of the force on the strand of the lifting rope, said control/command unit being configured or programmed to pilot the lifting winch in the connection phase and in the disconnection phase according to said measurement data of the force on the strand of the lifting rope.

In other words, the control/command unit will automatically pilot the reeving changes (also called the reeving configuration changes) based on the measurement data of the force on the strand of the lifting rope. In other words, the control/command unit, owing to its configuration/programming, allows automatically switching, without any manual intervention, from the double-stranded configuration into the single-reeved configuration, and vice versa, in a reliable, quick and repeatable manner over time; this control/command unit controlling the rise/descent movements of the lower reeve block (by simply controlling the motor-driven system of the lifting winch) to switch from the disconnected configuration into the connected configuration, and vice versa, according to variations in the measurements data of the force on the strand of the lifting rope.

Indeed, whether in the connection phase which involves an engagement of the locking element with the locking complementary element or in the disconnection phase which involves a release (or a disengagement) of the locking element and of the locking complementary element, the force on the strand of the lifting rope will vary, because the elastic return member will impart a resistive force during the switches from the “engaged” state into the “released” state, and vice versa from the “released” state into the “engaged” state.

Thus, the present disclosure suggests monitoring this force on the strand of the lifting rope to estimate the relative position between the locking element and the locking complementary element, and therefore the relative position between the two reeve blocks, and consequently pilot the lifting winch so as to displace the lower reeve block to rise or descend.

According to one possibility, the control/command unit is configured or programmed to pilot the lifting winch in the connection phase and in the disconnection phase according to a variation of the force on the strand of the lifting rope.

In other words, when a connection phase or a disconnection phase is initiated, the control/command unit monitors variations in the force on the strand of the lifting rope to estimate the relative position between the two reeve blocks and thus adapt the movements of the lower reeve block when raising/lowering.

In a particular embodiment, the control/command unit is configured or programmed to pilot the lifting winch in the connection phase or in the disconnection phase, in order to raise the lower reeve block, until detecting a predefined increase in the force on the strand of the lifting rope.

Thus, by observing such an increase, the control/command unit estimates that a contact causes such an increase (depending on whether we are in the connection phase or in the disconnection phase), thus making it possible to adapt the movement of the lower reeve block.

According to another possibility, the control/command unit is configured or programmed, in the connection phase, to pilot the lifting winch in order to make the lower reeve block rise until detecting a predefined increase in the force on the strand of the lifting rope, called increase in connection phase.

Indeed, in the connection phase, the lower reeve block rises alone until the locking element comes into contact with the locking complementary element then, the lower reeve block continuing its rise, the locking element will engage with the locking complementary element, with, at the same time, the elastic return member which will impart a resistive force, which is reflected by an increase in the force on the strand of the lifting rope during the rise of the lower reeve block and during the engagement.

According to one feature, the increase in connection phase of the force on the strand of the lifting rope is characterized by a passage of the force beyond a given connection force threshold, or by a variation slope of the force above a given connection slope value.

The control/command unit is configured or programmed, in the connection phase, to pilot the lifting winch in order to carry on the rise of the lower reeve block until detecting a decrease in the force on the strand of the lifting rope, after the predefined increase in connection phase, and to stop the rise of the lower reeve block in response to the detection of said decrease in the force on the strand of the lifting rope.

Indeed, during the engagement between the locking element and the locking complementary element, the resistive force imparted by the elastic return member vanishes, which is reflected by a decrease in the force on the strand of the lifting rope. Thus, detecting this decrease amounts to detecting this engagement, and therefore the lower reeve block could be stopped while rising.

According to another feature, the control/command unit is configured or programmed, in the connection phase and after having stopped the rise of the lower reeve block, to pilot the lifting winch in order to make the lower reeve block descend.

In a particular embodiment, the control/command unit is configured or programmed, in the disconnection phase, to pilot the lifting winch in order to make the lower reeve block rise, until detecting a predefined increase in the force on the strand of the lifting rope, called increase in disconnection phase, to stop the rise of the lower reeve block.

Indeed, in the disconnection phase, the lower reeve block rises with the upper reeve block until the upper reeve block abuts at the top then, the lower reeve block continuing rising, the locking element will disengage with the locking complementary element, and at the same time the elastic return member will impart a resistive force, which is reflected by an increase in the force on the strand of the lifting rope during the rise of the lower reeve block. Afterwards, the locking element is released from the locking complementary element, which is detectable by a passage of the force beyond a given threshold. Thus, detecting this increase in disconnection phase of the force amounts to detecting this release, and therefore the lower reeve block could be stopped while rising.

According to one feature, the predefined increase in disconnection phase of the force on the strand of the lifting rope is characterized by a passage of the force beyond a given disconnection force threshold.

According to another feature, the control/command unit is configured or programmed, in the disconnection phase and after having stopped the rise of the lower reeve block, to pilot the lifting winch in order to make the lower reeve block descend.

Advantageously, the sensor is a load sensor mounted on the lifting machinery so as to be able to measure a weight specific to the lower reeve block.

In other words, this feature suggests using a load sensor which is conventionally present on the crane, as it is used to determine the weight of the load hinging to the hook of the lower reeve block; which may be advantageous since it does not involve a dedicated sensor, but rather a sensor that is already present.

In a particular embodiment, the load sensor is a load pin mounted on a system for deflecting the lifting rope.

In other words, the load pin is mounted on the deflection system on which the lifting rope is wound or unwound, the load pin measuring a torsion force from which the force exerted on the strand of the rope can be deduced.

The load pin is an integral part of the equipment installed on the crane in order to measure the force exerted on the lifting rope and to ensure the proper completion of the lifting operation when the crane is working. This is not an additional monitoring device added to the crane for the sole purpose of enabling monitoring of a reeving configuration change.

In a particular embodiment, the locking element is a pawl pivotally mounted on one of the two reeve blocks so as to be movable within a locking channel, and the locking complementary element is a shaft mounted on the other one of the two reeve blocks.

The present disclosure also relates to a reeving configuration change method in a lifting machinery as disclosed above, wherein the control/command unit receives from the sensor measurement data of the force on the stand of the lifting rope and automatically monitor a reeving configuration change based on the measurement data of the force on the strand of the lifting rope, said control/command unit piloting the lifting winch in the connection phase and in the disconnection phase according to said measurement data of the force on the strand of the lifting rope.

BRIEF DESCRIPTION OF THE DRAWINGS

Other features and advantages of the present disclosure will appear upon reading the detailed description hereinafter, of a non-limiting example of implementation, made with reference to the appended figures wherein.

DESCRIPTION

Figure 1:
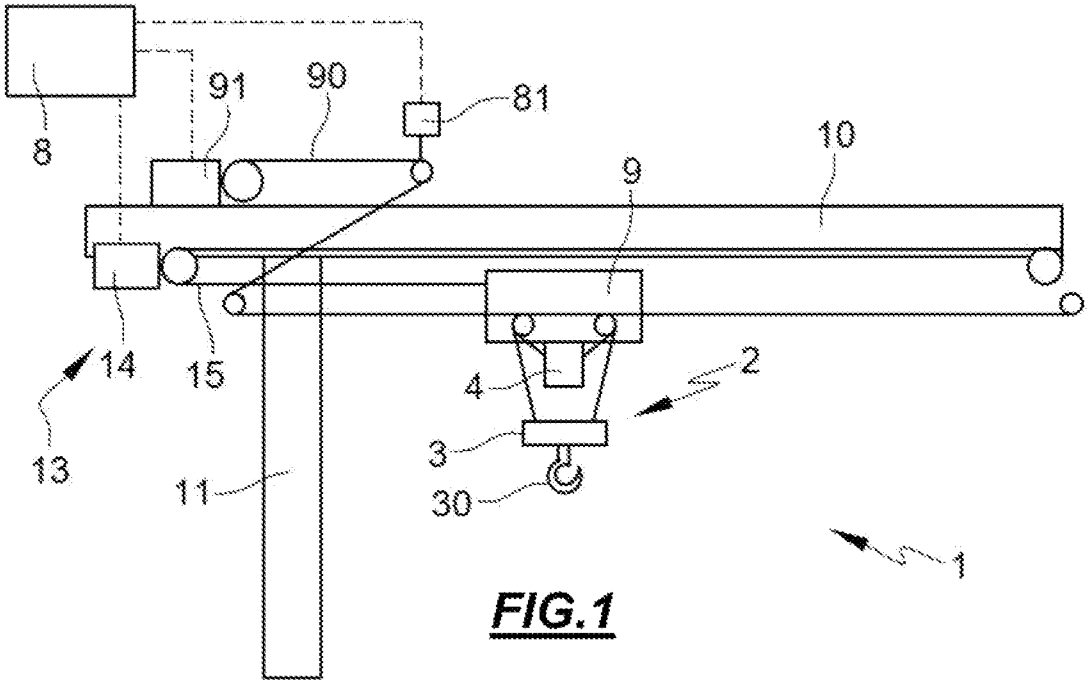
FIG. 1 is a schematic view of a lifting crane in a single-reeved configuration in accordance with an example of the present disclosure.

Referring to FIG. 1, a lifting machinery of the crane 1 type, according to an embodiment of the present disclosure, comprises a jib 10 mounted on a mast 11, and a dispenser carriage 9 mounted movable on the jib 10 and connected to a dispense system 13 capable of displacing the dispenser carriage 9 along the jib 10 according to opposite forward direction and backward direction; this dispense system 13 being, for example, a dispense winch 14 which cooperates with a dispense rope 15 for the displacement of the dispenser carriage 9.

The crane 1 comprises a double-reeved lifting device 2 which comprises two reeve blocks 3, 4, namely:

- a lower reeve block 3 secured to a lifting hook 30 intended to hook a load, where the lower reeve block 3 hangs from a dispenser carriage 9 (and therefore hangs to the jib 10) by a lifting rope 90 connected to a lifting winch 91 to make the lower reeve block 3 rise/descend (for example, depending on a direction of operation (e.g., winding or unwinding) of the lifting winch 91); and
- an upper reeve block 4 through which the lifting rope 90 passes, the upper reeve block 4 also hanging to the dispenser carriage 9. That is, the lower reeve block 3 may hang from a dispenser carriage 9 by a lifting rope 90 connected to a lifting winch 91 such that the lower reeve block 3 may alternately rise (e.g., be lifted) and descend (e.g., be lowered).

Also, the lower reeve block 3 supports lower rope deflection means, like for example two pulleys 31, for the passage of the lifting rope 90, and the upper reeve block 4 supports upper rope deflection means, like for example a pulley 41, for the passage of the lifting rope 90.

Thus, the double-reeved lifting device 2 is designed so as to raise/lower a load along the jib 10 of the crane 1. That is, the double-reeved lifting device 2 may be designed to alternately lift and lower a load.

The two reeve blocks 3, 4 are equipped with a reversible connection mechanical system so as to be reversibly configurable between two reeving configurations, which are:

- a connected configuration (illustrated in FIGS. 3 and 4) in which the upper reeve block 4 is connected to the lower reeve block 3 so as to be able to accompany it in rise/descent movements according to a main axis which extends vertically, and
- a disconnected configuration (illustrated in FIGS. 1 and 2) in which the upper reeve block 4 is disconnected off the lower reeve block 3 so as to be able to remain hanging above the lower reeve block 3 which could perform descent/rise movements alone without the upper reeve block 4.

Depending on the passage of the lifting rope 90 in the lower rope deflection means 31 provided on the lower reeve block 3 and in the upper rope deflection means 41 provided on the upper reeve block 4, the connected configuration and the disconnected configuration respectively correspond to a double-reeved configuration and to a single-reeved configuration, or vice versa, of the double-reeved lifting device 2; the single-reeved configuration being associated with a support of the hook 30 (and therefore of the load) by two lifting strands of the lifting rope 90, and the double-reeved configuration being associated with a support of the hook 30 (and therefore of the load) by four lifting strands of the lifting rope 90.

Figure 2:
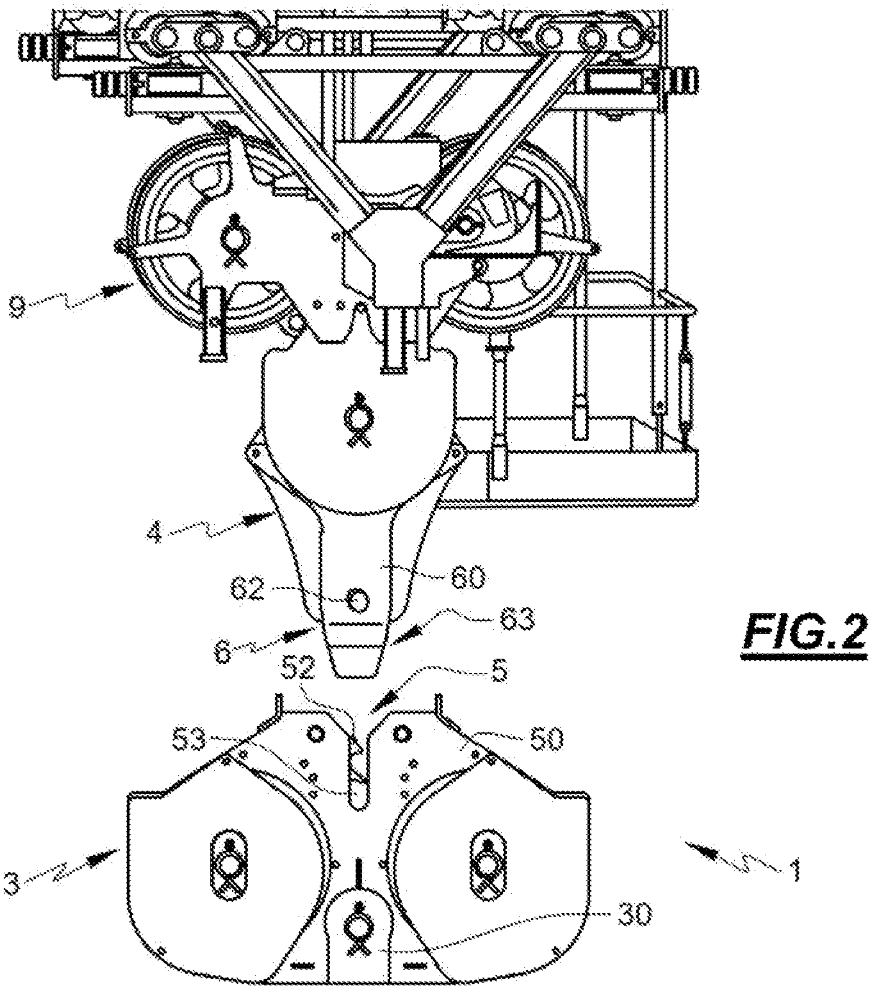
FIG. 2 is a schematic view of a portion of the crane illustrating its double-reeved lifting device, when hanging on a dispenser carriage, in a disconnected configuration corresponding to the single-reeved configuration according to a present example.
Figure 3:
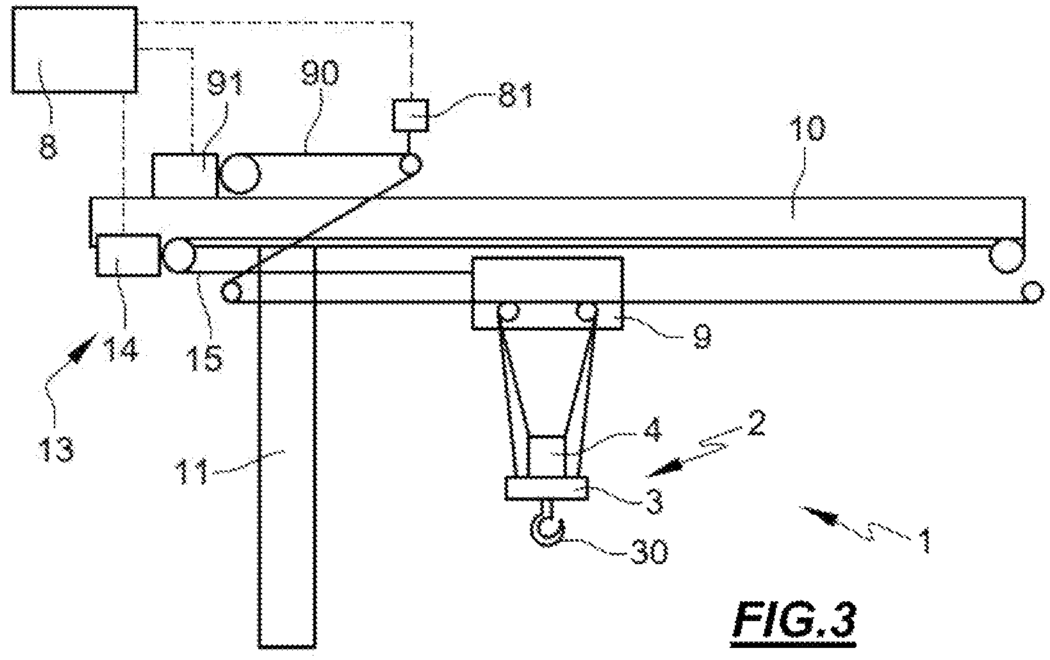
FIG. 3 is a schematic view of a schematic view of a lifting crane similar to that of FIG. 1 but in a double-reeved configuration according to a present example.
Figure 4:
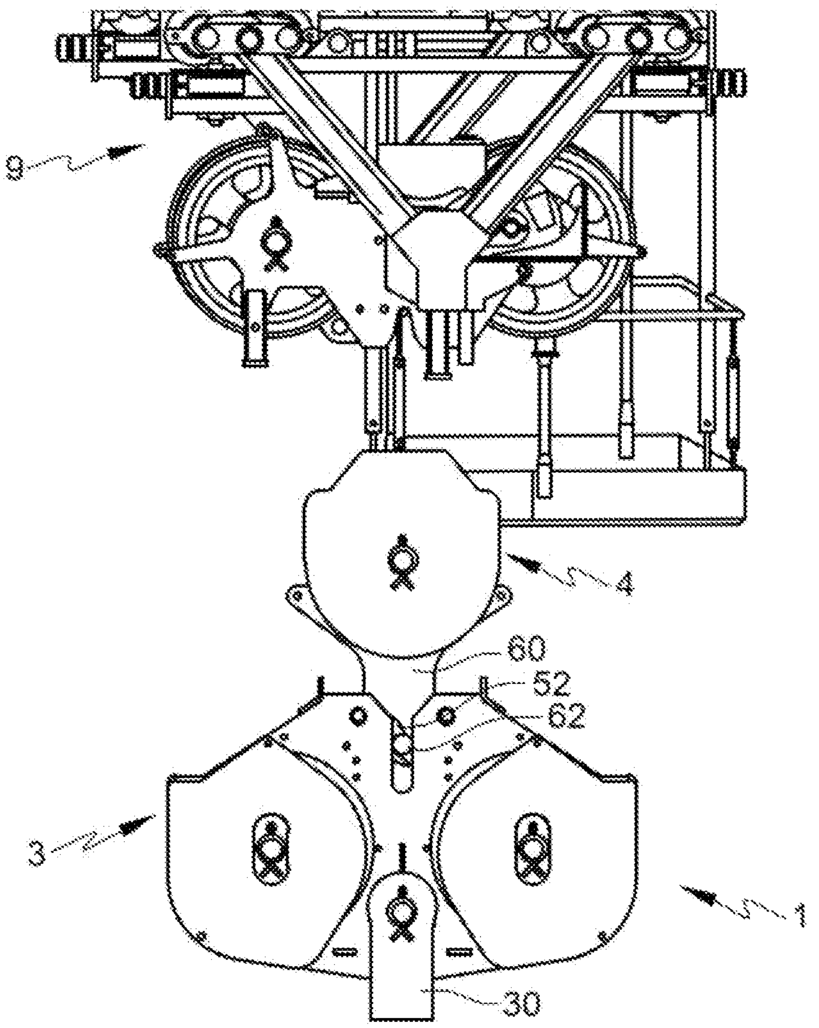
FIG. 4 is a schematic view of a portion of the lifting crane similar to that of FIG. 2, but with its double-reeved lifting device in the connected configuration corresponding to the double-reeved configuration according to a present example.

In the illustrated example, the connected configuration of FIGS. 3 and 4 corresponds to the double-reeved configuration (with four strands), so that the disconnected configuration of FIGS. 1 and 2 corresponds to the single-reeved configuration (with two strands).

The reversible connection mechanical system comprises a locking mechanism 5 mounted on the lower reeve block 3, and a locking complementary structure 6 mounted on the upper reeve block 4 and capable of cooperating with the locking mechanism 5.

The locking mechanism 5 is integrated with the lower reeve block 3 and it is provided above the lower rope deflection means, therefore above the two pulleys 31 in the illustrated example. This locking mechanism 5 comprises:

- a frame 50 comprising two subplates opposite one another and which delimit an interstitial space therebetween; and
- a pawl 52 pivotally mounted on the frame 50, between these two subplates, where the pawl 52 is associated with a pushing device 7 described later on.

The locking complementary structure 6 is part of the upper reeve block 4 and it is provided above the upper rope deflection means, and therefore above the pulley 41 in the illustrated example. This locking complementary structure 6 comprises:

- a frame 60 comprising two flanges opposite one another and which delimit an open groove therebetween on the underside of the upper reeve block 4 to define an entrance; and
- a locking member 62 securely supported by the frame, where this locking member 62 forms a shaft extending according to a longitudinal axis orthogonal to the main axis, and where this locking member 62 extends between the two flanges of the frame 60 at a given distance from the entrance of the groove.

The frame 50 has a locking channel 53 with an elongate shape according to the main axis (and therefore according to a vertical direction), where this locking channel 53 is formed by two notches formed opposite one another in the two subplates of the frame 50 and opening onto upper flanges of these subplates, so that this locking channel 53 is provided with a mouthpiece through which the locking member 62 of the locking complementary structure 6 could come in and out of the locking channel 53. The mouthpiece is flared to facilitate and center the insertion of the locking member 62 inside the locking channel 53.

The pawl 52 is provided with a free end having a concave shape able to engage with the locking member 62, where the free end has a cutout with a shape complementary to the locking member 62. Thus, the pawl 52 forms a locking element and the locking member 62 forms a locking complementary element, where the pawl 52 is designed so as to engage with said locking member 62 in the connected configuration.

The pushing device 7 extends between the two subplates of the frame 50 and it comprises a push stop 70 provided with a free front end able to abut against the pawl 52, and more specifically against a bearing surface provided proximate to the pivot axis. This push stop 70 also has a free rear end, opposite to the free front end. The push stop 70 is in the form of an elongate part according to an axis of extension orthogonal to the main axis.

Figure 5:
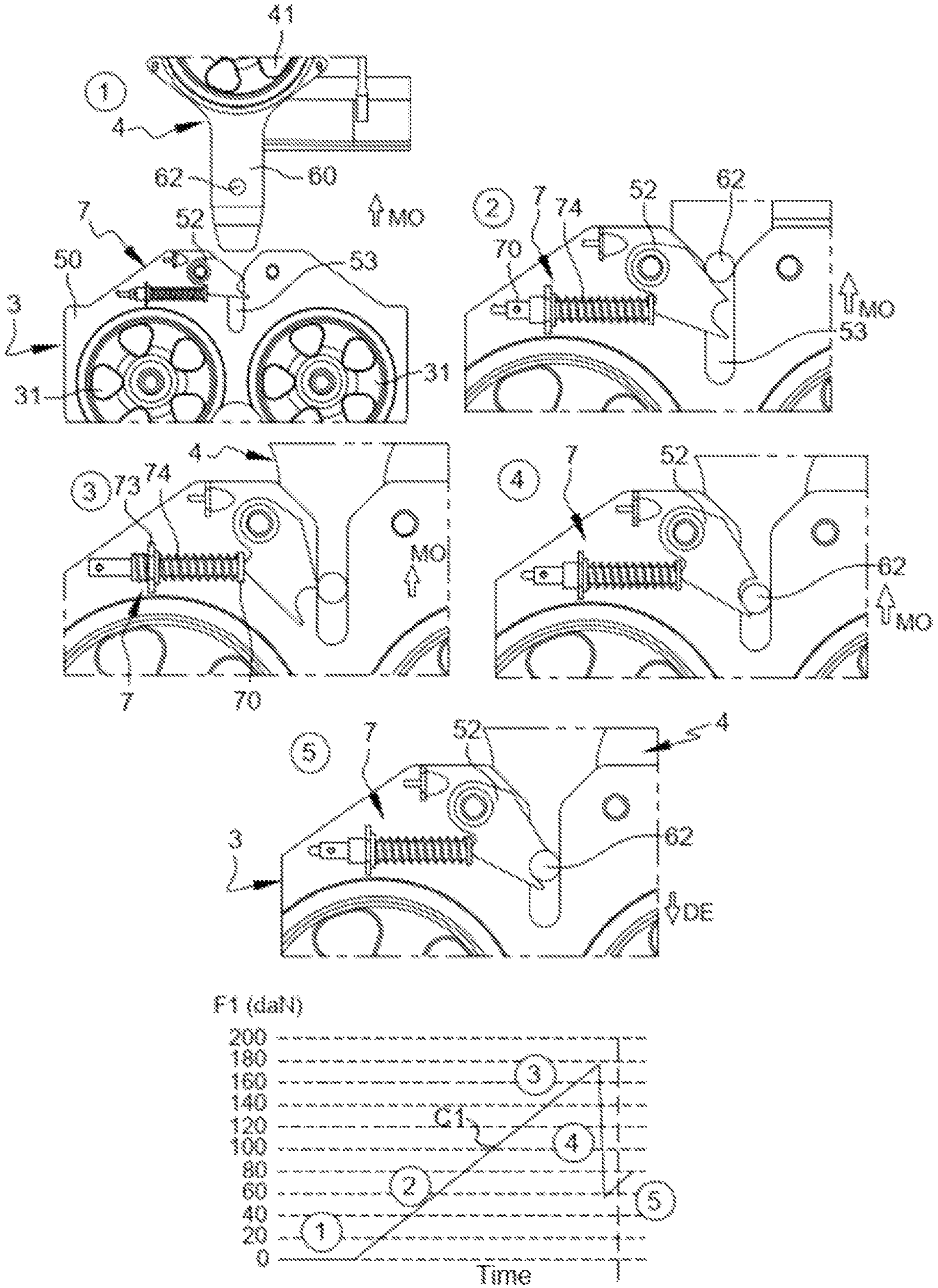
FIG. 5 is a partial schematic view of the double-reeved lifting device of FIGS. 2 and 4, in several steps of a connection phase (switch from the single-reeved configuration into the double-reeved configuration), with an illustration of the curve of variation of a force on a strand of the lifting rope during this connection phase according to a present example.
Figure 6:
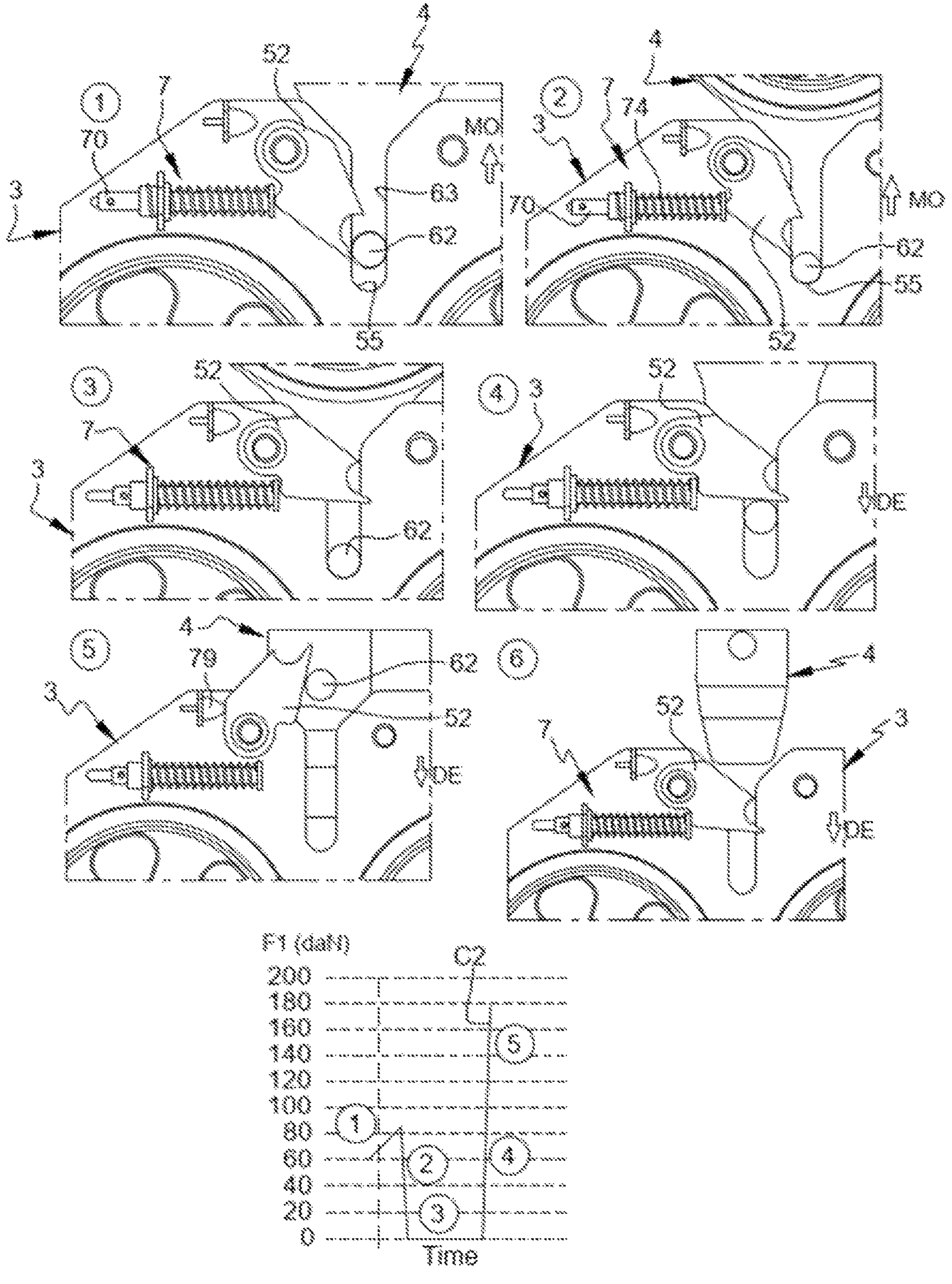
FIG. 6 is a partial schematic view of the double-reeved lifting device of FIGS. 2 and 4, in several steps of a disconnection phase (switch from the double-reeved configuration into the single-reeved configuration), with an illustration of the curve of variation of a force on a strand of the lifting rope during this disconnection phase according to a present example.

The push stop 70 is mounted movable in translation on the frame 50, according to a direction of translation orthogonal to the main axis. The push stop 70 slides between:

- a forward maximum position (visible in FIG. 5 and step (1) and FIG. 6 steps (3), (4) and (6)) in the absence of a push exerted by the pawl 52 on its free front end, and
- rearward positions (visible in FIG. 5 steps (2) to (5) and FIG. 6 steps (1) and (2)) in the presence of a pushing force exerted by the pawl 52 on its free front end.

The push stop 70 passes through and slides within a fixed support 73 secured to the frame 50, so that the free front end and the free rear end arranged on either side of the fixed support 73.

The pushing device 7 further comprises an elastic return member 74, for example in the form of a helical spring, this elastic return member 74 urging the push stop 70 towards its forward maximum position and imparting a force resisting a pushing force exerted by the pawl 52 on its free front end. Thus, the elastic return member 74 is at rest in the forward maximum position of the push stop 70.

In the illustrated example, this elastic return member 74 is interposed between the fixed support 73 and the free front end, and more specifically a stop surface provided on the free front end. Thus, when the pawl 52 exerts a pushing force on the free front end, making the push stop 70 recoil, while the elastic return member 74 is compressed and thus resists this recoil. Hence, this elastic return member 74 urges the paw 52 so as to engage with the locking member 62.

According to the present disclosure, the crane 1 further comprises a control/command unit 8 (for example of the type comprising at least one electronic board, a processor and/or a microcontroller) piloting the lifting winch 91 in order to make the lower reeve block 3 rise/descend so as to engage, in the connection phase, the pawl 52 with the locking member 62 and thus switch into the connected configuration and so as to release, in a disconnection phase, the pawl 52 off the locking member 62 and thus switch into the disconnected configuration. That is, the control/command unit 8 may be connected to one or more crane components, such as the lifting winch 91, and may be configured to control operations of one or more crane components.

The crane 1 further comprises a sensor 81 to measure a force F1 on a strand of the lifting rope 90. This sensor 81 may be a load sensor mounted on the crane 1 so as to be able to measure a weight specific to the lower reeve block 3, like a load pin mounted on a system for deflecting the lifting rope 90.

Thus, the control/command unit 8 is connected to this sensor 81 to receive measurement data of the force F1 on the lifting rope 90 and to this control/command unit 8 is configured or programmed to pilot the lifting winch 91 in the connection phase and in the disconnection phase according to these measurement data of the force F1 on the strand of the lifting rope 90.

In this manner, the control/command unit 8 automatically pilots the reeving configuration changes based on the measurement data of the force F1 on the strand of the lifting rope 90, this control/command unit 8 controlling the rise/descent movements of the lower reeve block 3 (by piloting the lifting winch 91) to switch from the disconnected configuration into the connected configuration, and vice versa, according to the variations of the measurements data of the force F1 on the strand of the lifting rope 90.

Indeed, in the connection phase and in the disconnection phase, only the control of the rise/descent movements of the lower reeve block 3 allows switching from a connected configuration into the disconnected configuration, and vice versa. The control of the rise/descent movements of the lower reeve block 3 is done by controlling the lifting winch 91.

Also, the control/command unit 8 allows automating the displacements of the lower reeve block 3, in the connection phase and in the disconnection phase, based on the measurement data of the force F1.

The following description covers the connection phase for switching from the disconnected configuration into the connected configuration, with reference to FIG. 5, with several successive steps numbered from (1) to (5) illustrating the two reeve blocks 3, 4, and with a curve C1 illustrating the variation of the measurement of the force F1 (expressed in daN) on the strand of the lifting rope 90 over time at the different steps (1) to (5) illustrated above the curve C1.

Referring to FIG. 5, step (1), in the disconnected configuration, the upper reeve block 4 hangs above the lower reeve block 3 and the pawl 52 is in the neutral position, with the push stop 70 in the forward maximum position. To switch from the disconnected configuration into the connected configuration, the lower reeve block 3 begins by being raised, as schematized by the arrow MO, to relatively approach the two reeve blocks 3, 4, until, with reference to FIG. 5, step (2), the locking member 62 comes into the locking channel 53 through the mouthpiece and comes into contact with a proximal flange of the pawl 52, thereby setting the upper reeve block 4 in abutment at the top on the jib, and more specifically until an upper stop of the upper reeve block 4 abuts against the dispenser carriage 9.

Referring to FIG. 5, steps (3) and (4), by carrying on the rise of the lower reeve block 3, the locking member 62 exerts a push on the proximal flange of the pawl 52, while sliding inside the locking channel 53 according to the entry direction (downwards), to set the pawl 52 in a distal position in which the locking member 62 bears on a proximal tip of the pawl 52 (cf. step (3)), then the locking member 62 overpasses this proximal tip of the pawl 52 and then the locking member 62 breaks contact with this proximal tip (cf. step (4)), and thus the pawl 52 pivots in a proximal direction of rotation (upwards) by the effect of a push exerted by the pushing device 7, until a distal flange of the pawl 52 comes, in turn, into contact with the locking member 62, as schematized in step (4). Thus, and as shown in step (4), the locking member 62 fits inside the free end of the pawl 52.

Referring to FIG. 5, step (5), the lower reeve block 3 is then displaced so as to descend, as schematized by the arrow DE, so that the locking member 62 slides inside the locking channel 53 according to the exit direction (upwards), and sets the pawl 52 in the locking position, until the locking member 62 is wedged inside the free end of the pawl 52 and sliding thereof is therefore blocked in the locking channel 53 according to the exit direction, and thus the lower reeve block 3 and the upper reeve block 4 are connected.

In other words, in the connected configuration, the pawl 52 is in the locking position and the locking member 62 is wedged inside the free end of the pawl 52, more specifically the locking member 62 wedged inside the cutout of this free end.

In this connected configuration, the lower reeve block 3 could be descended together with the upper reeve block 4. Indeed, when the lower reeve block 3 descends with its pawl 52, this pawl 52 is blocked by the locking member 62 and cannot pivot according to the proximal direction of rotation (upward pivoting). Thus, the pawl 52 remains blocked in the locking position with the locking member 62 which, as it should be reminded, is secured to the upper reeve block 4. Hence, the upper reeve block 4 is connected to the lower reeve block 3 and therefore descends with the latter.

As shown in the curve C1 of FIG. 5, during step (1), the force F1 is constant in the absence of contact between the locking member 62 and the pawl 52. During steps (3) and (4), the force F1 increases as long as the locking member 62 exerts a push on the pawl 52. Then, the force F1 decreases during step (4) when the locking member 62 has overpassed the proximal tip of the pawl 52 and the pawl 52 pivots by the effect of a push exerted by the pushing device 7. Finally, during step (5), the forced F1 increases again during the decent of the lower reeve block 3 secured to the upper reeve block 4.

During steps (1) to (5) of the connection phase, the control/command unit 8 pilots the lifting winch 91 in order to:

- make the lower reeve block 3 rise, until detecting a predefined increase in the force F1 (called increase in connection phase), associated with steps (2) and (3); indeed, thanks to this measurement of an increase in the force F1, the control/command unit 8 deduces that the connection phase is initiated and that the locking member 62 and the pawl 52 start cooperating together;
- then carry on the rise of the lower reeve block until detecting a decrease in the force F1 (step (4)), after the predefined increase, and stop the rise of the lower reeve block 3 in response to the detection of said decrease in the force F1, and
- finally, after having stopped the rise of the lower reeve block 3, make the lower reeve block 3 descend (step (5)) which is henceforth connected to the upper reeve block 4.

It should be noted that the increase in connection phase of the force F1 during steps (3) and (4) may be characterized by a passage of the force F1 beyond a given connection force threshold, or by a variation slope of the force F1 (a slope measured on the curve C1 at steps (2) and (3)) above a given connection slope value.

It should also be noted that the control/command unit 8 could make the lower reeve block 3 rise until detecting:

- the decrease in the force F1 (which reflects step (4)), for example by detecting a negative derivative of the fore F1, or
- the passage of the force F1 beyond the given connection force threshold.

Figure 7:
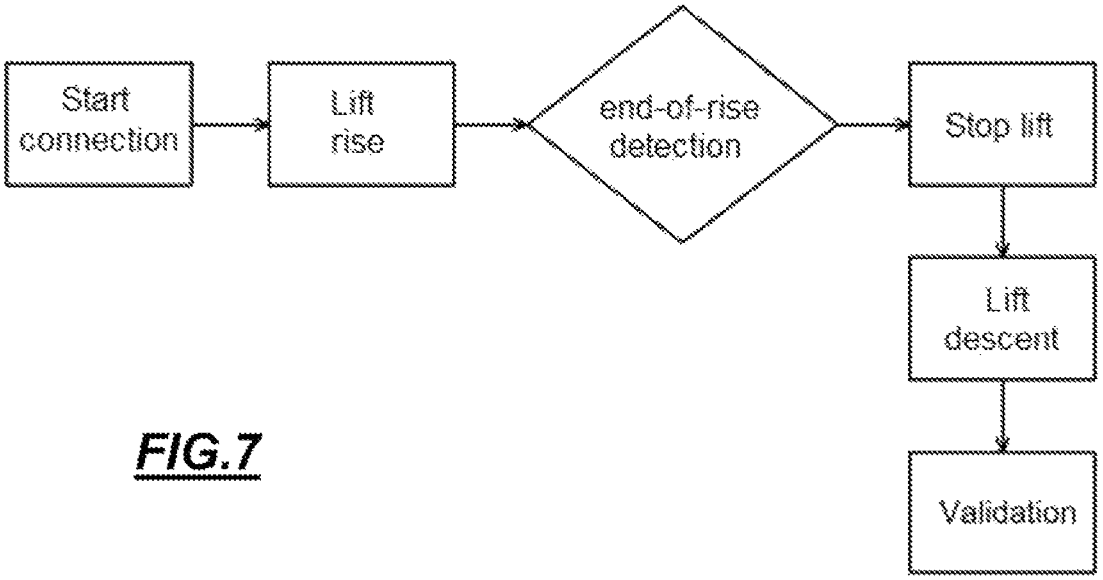
FIG. 7 is a schematic view of a control flowchart for the implementation of the connection phase by the control/command unit of the crane according to a present example.

FIG. 7 schematizes the phases implemented by the control/command unit 8 during the connection phase:

- step "start connection" initiated by an operator on a dedicated interface;
- step "lift rise" to pilot the lifting winch to rise, for example at a minimum rise speed;
- step "end-of-rise detection" which corresponds to the detection of the end of the rise of the lower reeve block 3 on the basis of the measurements of the force F1, like for example the detection of the decrease in the force F1 or the passage of the force F1 beyond the connection force threshold;
- step "stop lift" to pilot the stoppage of the lifting winch;
- step "lift descent" to pilot the lifting winch to descend, for example at the minimum descent speed;
- step "validation" initiated by an operator to validate that the connection phase is completed.

The following description covers the disconnection phase for switching from the connected configuration into the disconnected configuration, with reference to FIG. 6, with several successive steps numbered from (1) to (6) illustrating the two reeve blocks 3, 4, and with a curve C2 illustrating the variation of the measurement of the force F1 (expressed in daN) on the strand of the lifting rope 90 over time in the different steps (1) to (6) illustrated above the curve C2.

Referring to FIG. 6, step (1), for switching from the connected configuration into the disconnected configuration, the lower reeve block 3 is first raised (with the upper reeve block 4), as schematized by the arrow MO, until the upper reeve block 4 abuts at the top on the jib, and more specifically until the upper stop of the upper reeve block 4 abuts against the dispenser carriage.

Once the upper reeve block 4 abuts at the top, the lower reeve block 3 continues rising, as schematized by the arrow MO, while the upper reeve block 4 is blocked. Thus, as the locking channel 53 rises, the locking member 62 slides inside this locking channel 53 according to the entry direction (downwards), bearing in mind that the pawl 52 will not resist this sliding and that the pawl 52 will thus pivot in the distal direction of rotation (downwards) by the effect of a push exerted by the locking member 62 on a distal flange of the pawl 52. Also, the pawl 52 pivots downwards, whereas the locking member 62 slides in the direction of the bottom 55 of the locking channel 53, until the locking member 62 comes out of the free end of the pawl 52, overpasses its distal tip and finishes by breaking contact with the pawl 52, and afterwards, as illustrated in FIG. 6, steps (2) and (3), the pawl 52 returns into the neutral position by the effect of the push exerted by the pushing device 7, and the locking member 62 is under the pawl 52 (and even is arranged in the bottom 55 of the locking channel 53). During this step (4), the push stop 70 recoils by the effect of pivoting of the pawl 52 when the locking member 62 bears on the distal tip of the pawl 52, then the push stop 70 advances to bring the pawl 52 back into the neutral position by the effect of the elastic return member 74.

Referring to FIG. 6, steps (4) and (5), the lower reeve block 3 is displaced so as to descend, as schematized by the arrow DE, so that the locking member 62 slides inside the locking channel 53 according to the exit direction (upwards), until bearing against the distal flange of the pawl 52, thereby pushing the pawl 52 which then pivots in the proximal direction of rotation (upwards), thereby enabling the locking member 62 to come out of the locking channel 53 and to be cleared off the pawl 52. During these steps (4) and (5), the push stop 70 remains all the time in its forward maximum position, the pawl 52 breaking contact with its free front end by pivoting towards the proximal position.

Thus, and as illustrated in FIG. 6, step (6), the locking member 62 is completely cleared off the lower reeve block 3 and the pawl 52 has returned back in the neutral position by the effect of a possible proximal stop 79 mounted on the frame 50 and its own weight, and thus the lower reeve block 3 and the upper reeve block 4 are disconnected, which allows carrying on the descent of the lower reeve block 3 alone in the disconnected configuration, without the upper reeve block 4 which remains at the level of the dispenser carriage 9.

As shown in the curve C2 of FIG. 6, during step (1), the force F1 increases until the upper reeve block 4 abuts against the dispenser carriage and as long as the locking member 62 is in contact with the pawl 52 and exerts a push on this pawl 52. Then, the force F1 decreases to reach a zero value during steps (2) and (3), because of the loss of contact between the locking member 62 and the pawl 52. During steps (4) and (5), the force F1 increases again during the descent of the lower reeve block 3 which detach from the upper reeve block 4.

During steps (1) to (5) of the disconnection phase, the control/command unit 8 pilots the lifting winch 91 in order to:

make the lower reeve block 3 rise, until detecting an increase (step (1)) in the force F1 (called increase in disconnection phase) such that said force F1 reaches a given disconnection force threshold to stop the rise of the lower reeve block 3; indeed, thanks to this measurement of an increase in disconnection phase of the force F1 beyond the disconnection force threshold, the control/command unit 8 deduces that the disconnection phase is initiated and that the locking member 62 and the pawl 52 have connected together and are at step (3); and finally, after having stopped the rise of the lower reeve block 3, make the lower reeve block 3 descend (steps (4) to (6)) which disconnects from the upper reeve block 4.

Figure 8:
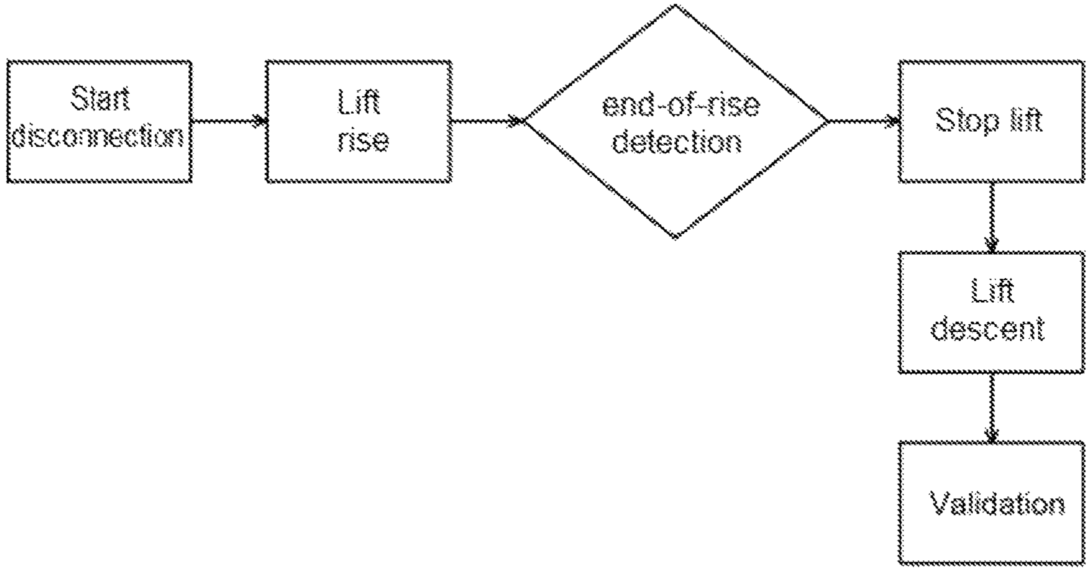
FIG. 8 is a schematic view of a control flowchart for the implementation of the disconnection phase by the control/command unit of the crane according to a present example.

FIG. 8 schematizes the phases implemented by the control/command unit 8 during the disconnection phase:

step “start disconnection” initiated by an operator on a dedicated interface;

step “lift rise” to pilot the lifting winch to rise, for example at a minimum rise speed;

step “end-of-rise detection” which corresponds to the detection of the end of the rise of the lower reeve block 3 on the basis of the measurements of the force F1, like for example the detection of the passage of the force F1 beyond the disconnection force threshold;

step “stop lift” to pilot the stoppage of the lifting winch;

step “lift descent” to pilot the lifting winch to descend, for example at the minimum descent speed;

step “validation” initiated by an operator to validate that the disconnection phase is completed.

Moreover, it could be considered to reverse the positions of the locking mechanism 5 and of the locking complementary structure 6 of the reversible connection mechanical system, by arranging the locking mechanism 5 on the upper reeve block 4 and by arranging the locking complementary structure 6 on the lower reeve block 3. It is also possible to operate with one single pawl 52 for the locking mechanism 5, by adapting the shape of the pawl 52 to wedge the locking member 62 in the locking channel 53. Alternatively, it is possible to operate with two or more than two pawls 52 for the locking mechanism 5. It could also be considered to provide for one or more elastic return member(s) other than the previously-described spring, like for example an elastic leaf, a return mechanism, or other equivalent elastic biasing means.

The invention claimed is:

1. A lifting machinery comprising:

a double-reeved lifting device comprising two reeve blocks, the two reeve blocks including a lower reeve block secured to a lifting hook and an upper reeve block, wherein the lower reeve block is hanging by a lifting rope connected to a lifting winch to make the lower reeve block rise/descend, the lifting rope passing through the upper reeve block, wherein the two reeve blocks comprise a reversible connection mechanical system to be reversibly configurable between two reeving configurations including:

a connected configuration in which the upper reeve block is connected to the lower reeve block so as to be able to accompany it in rise/descent movements according to a main axis, and a disconnected configuration in which the upper reeve block is disconnected from the lower reeve block so as to be able to remain hanging above the lower reeve block which is configured to perform descent/rise movements without the upper reeve block, wherein the reversible connection mechanical system comprises a locking element mounted on one of the two reeve blocks and a locking complementary element mounted on the other one of the two reeve blocks, the locking element being shaped so as to be engaged with the locking complementary element in the connected configuration, and an elastic return member urging the locking element to engage with the locking complementary element, the lifting machinery further comprising:

a control/command unit configured to pilot the lifting winch in order to make the lower reeve block rise/descend so as to engage, in a connection phase, the locking element with the locking complementary element and thus switch into the connected configuration and so as to release, in a disconnection phase, the locking element from the locking complementary element and thus switch into the disconnected configuration, and a sensor configured to measure a force on a strand of the lifting rope, wherein the control/command unit is connected to the sensor and configured to receive measurement data of the force on the strand of the lifting rope, wherein the control/command unit is configured or programmed to automatically monitor a reeving configuration change based on the measurement data of the force on the strand of the lifting rope, the control/command unit being configured or programmed to pilot the lifting winch in the connection phase and in the disconnection phase according to the measurement data of the force on the strand of the lifting rope and according to a variation of the force on the strand of the lifting rope; and wherein the control/command unit is configured or programmed to pilot the lifting winch in the connection phase or in the disconnection phase, in order to raise the lower reeve block, until detecting a predefined increase in the force on the strand of the lifting rope.

2. The lifting machinery according to claim 1, wherein the control/command unit is configured or programmed, in the connection phase, to pilot the lifting winch in order to make the lower reeve block rise until detecting a predefined increase in the force on the strand of the lifting rope, called an increase in connection phase.

3. The lifting machinery according to claim 2, wherein the increase in connection phase of the force on the strand of the lifting rope is characterized by a passage of the force beyond a given connection force threshold, or by a variation slope of the force above a given connection slope value.

4. The lifting machinery according to claim 2, wherein the control/command unit is configured or programmed, in the connection phase, to pilot the lifting winch in order to carry on the rise of the lower reeve block until detecting a decrease in the force on the strand of the lifting rope, after the increase in connection phase, and to stop the rise of the lower reeve block in response to the detection of the decrease in the force on the strand of the lifting rope.

5. The lifting machinery according to claim 4, wherein the control/command unit is configured or programmed, in the connection phase and after having stopped the rise of the lower reeve block, to pilot the lifting winch in order to make the lower reeve block descend.

6. The lifting machinery according to claim 1, wherein the control/command unit is configured or programmed, in the disconnection phase, to pilot the lifting winch in order to make the lower reeve block rise, until detecting a predefined increase in the force on the strand of the lifting rope, called an increase in disconnection phase, to stop the rise of the lower reeve block.

7. The lifting machinery according to claim 6, wherein the increase in disconnection phase of the force on the strand of the lifting rope is characterized by a passage of the force beyond a given disconnection force threshold.

8. The lifting machinery according to claim 6, wherein the control/command unit is configured or programmed, in the disconnection phase and after having stopped the rise of the lower reeve block, to pilot the lifting winch in order to make the lower reeve block descend.

9. The lifting machinery according to claim 1, wherein the sensor is a load sensor mounted on the lifting machinery so as to be able to measure a weight specific to the lower reeve block.

10. The lifting machinery according to claim 9, wherein the load sensor is a load pin mounted on a system for deflecting the lifting rope.

11. The lifting machinery according to claim 1, wherein the locking element is a pawl pivotally mounted on one of the two reeve blocks so as to be movable within a locking channel, and the locking complementary element is a shaft mounted on the other one of the two reeve blocks.

12. A reeving configuration change method in a lifting machinery, the lifting machinery comprising:

a double-reeved lifting device comprising two reeve blocks, the two reeve blocks including a lower reeve block secured to a lifting hook and an upper reeve block, wherein the lower reeve block is hanging by a lifting rope connected to a lifting winch to make the lower reeve block rise/descend, the lifting rope passing through the upper reeve block, wherein the two reeve blocks comprise a reversible connection mechanical system to be reversibly configurable between two reeving configurations including:

a connected configuration in which the upper reeve block is connected to the lower reeve block so as to be able to accompany it in rise/descent movements according to a main axis, and a disconnected configuration in which the upper reeve block is disconnected from the lower reeve block so as to be able to remain hanging above the lower reeve block which is configured to perform descent/rise movements without the upper reeve block, wherein the reversible connection mechanical system comprises a locking element mounted on one of the two reeve blocks and a locking complementary element mounted on the other one of the two reeve blocks, the locking element being shaped so as to be engaged with the locking complementary element in the connected configuration, and an elastic return member urging the locking element to engage with the locking complementary element, the lifting machinery further comprising:

a control/command unit configured to pilot the lifting winch in order to make the lower reeve block rise/descend so as to engage, in a connection phase, the locking element with the locking complementary element and thus switch into the connected configuration and so as to release, in a disconnection phase, the locking element from the locking complementary element and thus switch into the disconnected configuration, and a sensor configured to measure a force on a strand of the lifting rope, wherein the control/command unit is connected to the sensor and configured to receive measurement data of the force on the strand of the lifting rope, wherein the control/command unit is configured or programmed to automatically monitor a reeving configuration change based on the measurement data of the force on the strand of the lifting rope, the control/command unit being configured or programmed to pilot the lifting winch in the connection phase and in the disconnection phase according to the measurement data of the force on the strand of the lifting rope, the reeving configuration change method comprising:

receiving, by the control/command unit, the measurement data of the force on the strand of lifting rope, automatically monitoring, by the control/command unit, a reeving configuration change based on the measurement data of the force on the strand of the lifting rope, and piloting, by the control/command unit, the lifting winch in the connection phase and in the disconnection phase according to the measurement data of the force on the strand of the lifting rope and according to a variation of the force on the strand of the lifting rope; and piloting, by the control/command unit, the lifting winch in the connection phase or in the disconnection phase, in order to raise the lower reeve block, until detecting a predefined increase in the force on the strand of the lifting rope.

* * * * *